United States Patent
Lu et al.

(10) Patent No.: US 11,490,478 B1
(45) Date of Patent: Nov. 1, 2022

(54) HIGH-COMPATIBILITY DIMMER CIRCUIT

(71) Applicant: Xiamen PVTECH Co., Ltd., Fujian (CN)

(72) Inventors: Fuxing Lu, Fujian (CN); Rongtu Liu, Fujian (CN); Hao Ye, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/489,716

(22) Filed: Sep. 29, 2021

(30) Foreign Application Priority Data

Aug. 9, 2021 (CN) .......................... 202110911163.5

(51) Int. Cl.
*H05B 45/37* (2020.01)
*H05B 47/10* (2020.01)
*H05B 45/14* (2020.01)
*H02M 7/06* (2006.01)
*H05B 45/325* (2020.01)

(52) U.S. Cl.
CPC ............ *H05B 45/14* (2020.01); *H02M 7/066* (2013.01); *H05B 45/325* (2020.01); *H05B 45/37* (2020.01)

(58) Field of Classification Search
CPC ........ H05B 45/14; H05B 45/30; H05B 45/37; H05B 45/325; H05B 45/44; H05B 47/10; H05B 47/16; H05B 47/20
See application file for complete search history.

(56) References Cited

U.S. PATENT DOCUMENTS

| | | | | |
|---|---|---|---|---|
| 2007/0182347 A1* | 8/2007 | Shteynberg | ........ | H05B 45/3725 315/312 |
| 2011/0057576 A1* | 3/2011 | Otake | ................ | H05B 45/3725 315/291 |
| 2011/0140621 A1* | 6/2011 | Yl | .......................... | H05B 45/10 315/307 |
| 2012/0286686 A1* | 11/2012 | Watanabe | .......... | H05B 45/3725 315/226 |
| 2014/0265893 A1* | 9/2014 | Melanson | ............ | H05B 39/044 315/192 |

* cited by examiner

*Primary Examiner* — Thai Pham
(74) *Attorney, Agent, or Firm* — Winston Hsu

(57) ABSTRACT

A high-compatibility dimmer circuit is provided, which includes an impedance inspection avoidance module, a dimming module and an alternating-current input module. The impedance inspection avoidance module is connected to a load via an output end. The dimming module is connected to the impedance inspection avoidance module and includes a control unit. The alternating-current input module is connected to the dimming module, and converts an input alternating voltage into a pulsating direct voltage so as to power the load and the dimming module. When the load is driven, the control unit starts timing and switches the impedance inspection avoidance module after a predetermined time period. In this way, the dimming module can directly power the load and perform dimming for the load according to a dimming signal.

10 Claims, 4 Drawing Sheets

HIGH-COMPATIBILITY DIMMER CIRCUIT

BACKGROUND OF THE INVENTION

1. Field of the Invention

The present invention relates to a dimming circuit, in particular to a high-compatibility dimmer circuit.

2. Description of the Prior Art

Since the demand for lighting devices having dimming function keeps increasing, many lighting device providers strive to develop high-performance lighting devices having dimming function.

Currently, the dimming solutions used by currently available lighting devices include SCR dimming solution, multi-step and stepless dimming solutions (controlled by a wall switch), wired dimming solution (e.g., 0-10V, 1-10V, etc.), resistance dimming solution, wireless dimming solution (e.g., Bluetooth, WIFI, etc.). The dimming circuits of the above solutions are integrated in the drivers of lighting devices and all these solutions need the corresponding dimmers to realize the dimming function thereof. There are too many dimming solutions, which not only increases the costs of lighting devices having dimming function, but also limits the commonality and penetration rate thereof.

SUMMARY OF THE INVENTION

One embodiment of the present invention provides a high-compatibility dimmer circuit, which includes an impedance inspection avoidance circuit, a dimming module and an alternating-current input module. The impedance inspection avoidance module is connected to a load via an output end. The dimming module is connected to the impedance inspection avoidance module and includes a control unit. The alternating-current input module is connected to the dimming module, and converts an input alternating voltage into a pulsating direct voltage so as to power the load and the dimming module. When the load is driven, the control unit starts timing and switches the impedance inspection avoidance module after a predetermined time period. In this way, the dimming module can directly power the load and perform dimming for the load according to a dimming signal.

In one embodiment, the dimming module further includes a pulse width modulation signal totem-pole unit and a constant-current switch unit. The control unit is connected to the pulse width modulation signal totem-pole unit and the constant-current switch unit. The pulse width modulation signal totem-pole unit is connected to the constant-current switch unit. The constant-current switch unit is connected to the alternating-current input module and the impedance inspection avoidance module.

In one embodiment, when the input end is short-circuited, the control unit controls the constant-current switch unit to enter a hiccup mode in order to perform a short-circuit protection function.

In one embodiment, the control unit generates a pulse width modulation signal according to the dimming signal and the pulse width modulation signal totem-pole unit generates an enhanced pulse width modulation signal according to the pulse width modulation signal. The constant-current switch unit changes the mode of turning on/off the switches according to the enhanced pulse width modulation signal in order to adjust the driving current of the load and perform dimming.

In one embodiment, the high-compatibility dimmer circuit further includes a power factor correction module. The constant-current switch unit is connected to the alternating-current input module via the power factor correction module, and the power factor correction module generates a boosted direct voltage according to the pulsating direct voltage in order to power the dimming module.

In one embodiment, the power factor correction module is an active power factor correction module.

In one embodiment, the high-compatibility dimmer circuit further includes a constant-voltage power supply module. The dimming module is connected to the alternating-current input module via the constant-voltage power supply module, and the constant-voltage power supply module converts the pulsating direct voltage into a constant voltage so as to power the dimming module.

In one embodiment, the predetermined time period is 0.1-0.5 seconds.

In one embodiment, the load is a light source without dimming function.

In one embodiment, the impedance inspection avoidance module is any one of a mechanical relay, a solid-state relay, an electronic switch and a photoelectric switch.

As described above, the high-compatibility dimmer circuit according to the embodiments of the present invention may have one or more of the following advantages:

(1) In one embodiment of the present invention, the design of the high-compatibility dimmer circuit can take full advantage of the original characteristics of switch power sources, which can reduce the voltage by controlling the current. Thus, the high-compatibility dimmer circuit can be compatible with various direct-current (DC) or alternating-current (AC) lighting devices so as to achieve high commonality.

(2) In one embodiment of the present invention, the design of the high-compatibility dimmer circuit can be compatible with various DC or AC lighting devices having no dimming function. Therefore, the high-compatibility dimmer circuit can serve as an effective and low-cost solution in order to conform to actual requirements.

(3) In one embodiment of the present invention, the high-compatibility dimmer circuit has an impedance inspection avoidance module, which can perform a special operating mechanism in order to provide an AC-grid impedance inspection avoidance function. Accordingly, the high-compatibility dimmer circuit can be compatible with all lighting devices having AC-grid impedance inspection function with a view to further increase the commonality thereof.

(4) In one embodiment of the present invention, the circuit design of the high-compatibility dimmer circuit can make the output current be proportional to the output voltage to achieve a linear relation, so the high-compatibility dimmer circuit can be more comprehensive in application.

(5) In one embodiment of the present invention, the high-compatibility dimmer circuit can control the constant-current switch unit to enter the hiccup mode in order to perform the short-circuit protection function. Therefore, the safety of the high-compatibility dimmer circuit can be further enhanced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
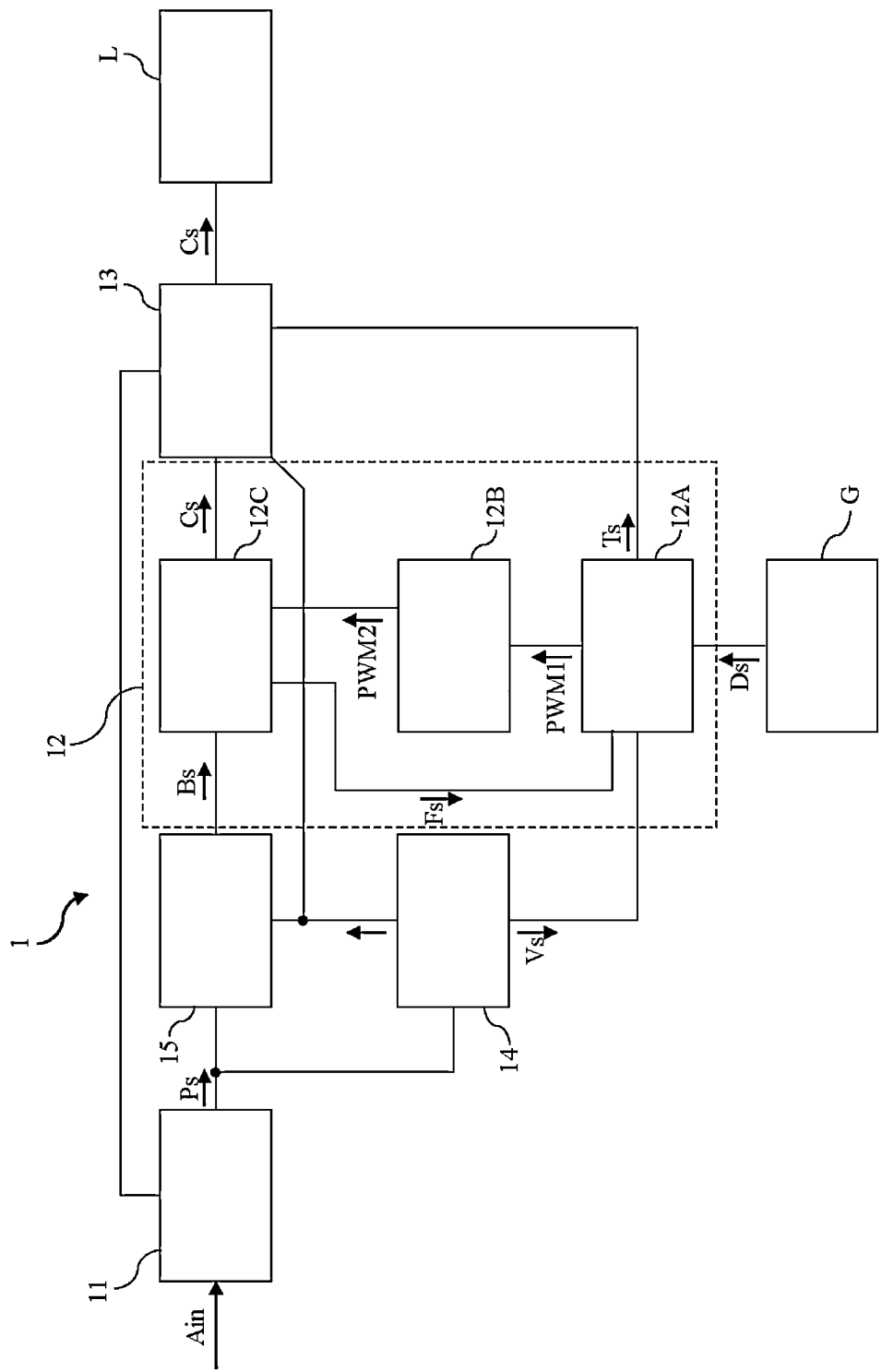
FIG. 1 is a block diagram of a high-compatibility dimmer circuit in accordance with a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
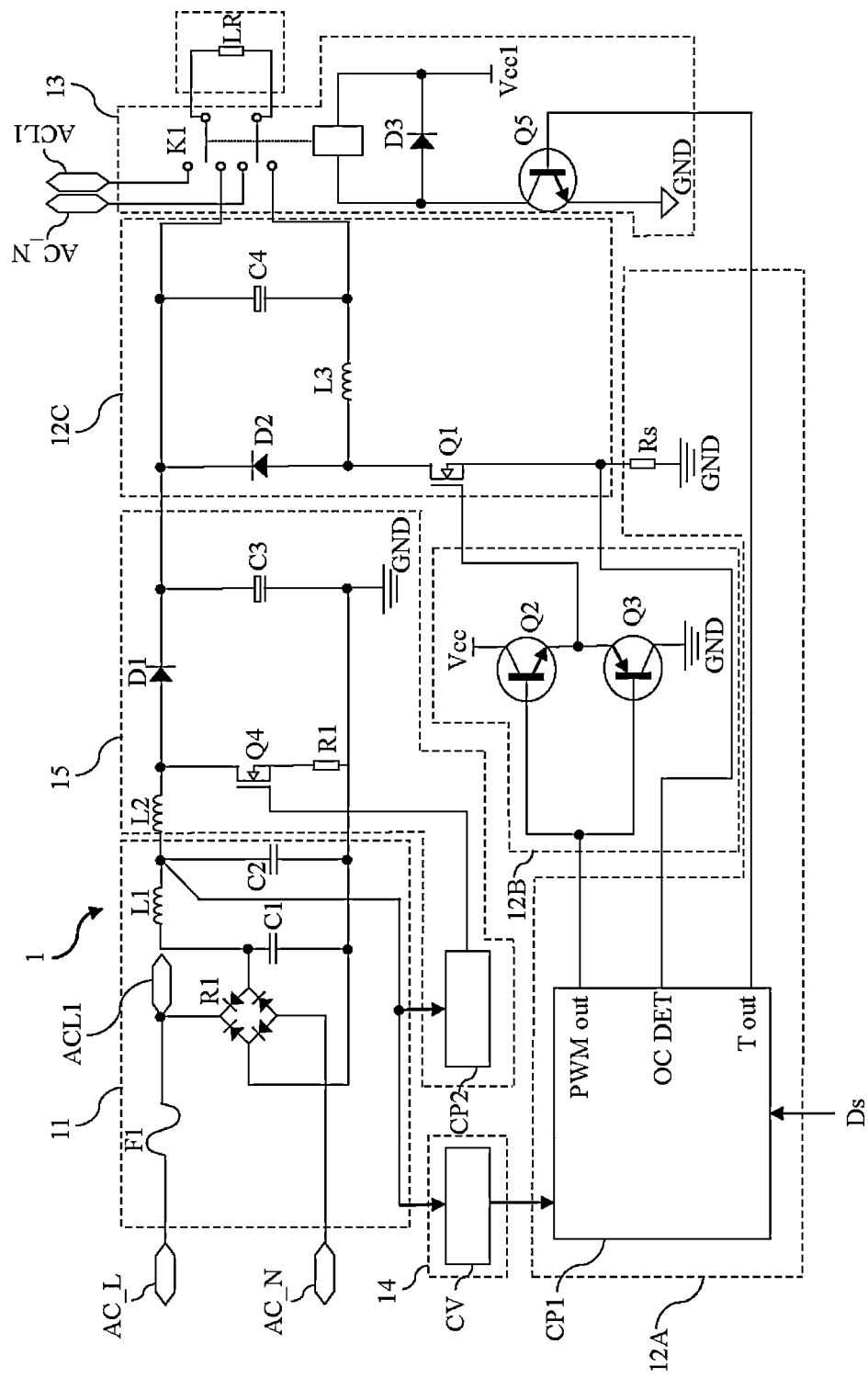
FIG. 2 is a circuit diagram of the high-compatibility dimmer circuit in accordance with the first embodiment of the present invention.

Please refer to FIG. 1 and FIG. 2, which are a block diagram and a circuit diagram of a high-compatibility dimmer circuit in accordance with a first embodiment of the present invention respectively. As shown in FIG. 1, the high-compatibility dimmer circuit 1 includes an alternating-current input module 11, a power factor correction (PFC) module 15, a dimming module 12, an impedance inspection avoidance module 13 and a constant-voltage power supply module 14.

The impedance inspection avoidance module 13 is connected to a load LR via an output end. In one embodiment, the load LR and may be a light source having no dimming function, such as a light bulb, a light tube, a panel light, or other light-emitting diode (LED) light sources.

The dimming module 12 is connected to the impedance inspection avoidance module 13, and includes a control unit 12A, a pulse width modulation (PWM) signal totem-pole unit 12B and a constant-current switch unit 12C. In one embodiment, the control unit 12A may be a microcontroller unit (MCU) or other control chips.

The alternating-current input module 11 is connected to the dimming module 12 via the PFC module 15. The alternating-current input module 11 rectifies and filters an input alternating voltage Ain via a bridge rectifier and a filter capacitor respectively in order to generate a pulsating direct voltage Ps. The pulsating direct voltage Ps is inputted into a constant-voltage power supply module 14 and the constant-voltage power supply module 14 converts the pulsating direction voltage Ps into a constant voltage Vs so as to power the control unit 12A and the impedance inspection avoidance module 13. The PFC module 15 boosts the pulsating direct voltage Ps to generate a boosted direct voltage Bs for powering the load LR. In one embodiment, the PFC module 15 may be, but not limited to, an active PFC circuit.

After the load LR is driven, the control unit 12A starts timing and switches the impedance inspection avoidance module 13 after a predetermined time period, such that the dimming module 12 can directly power the load LR. Meanwhile, the dimming module 12 can performs dimming for the load LR according to a dimming signal Ds inputted by an external device G. In one embodiment, the dimming signal Ds may be, but not limited to, a PWM signal (0-10V), a resistance or other dimming signals.

The embodiment just exemplifies the present invention and is not intended to limit the scope of the present invention; any equivalent modification and variation according to the spirit of the present invention is to be also included within the scope of the following claims and their equivalents.

FIG. 2 illustrates one of the preferred circuit designs of the high-compatibility dimmer circuit 1. As shown in FIG. 2, the alternating voltage input module 11 may include a fuse F1, a bridge rectifier R1, capacitors C1~C2 and an inductor L1. The control unit 12A may include a microcontroller unit CP1 and a resistor Rs; the microcontroller unit CP1 can be replaced by other similar components. The PWM signal totem-pole unit 12B may include transistors Q2~Q3; in another embodiment, the PWM signal totem-pole unit 12B may also be a totem-pole chip. The constant-current switch unit 12C may include a transistor Q1, a diode D2, an inductor L3 and a capacitor C4. The impedance inspection avoidance module 13 may include a relay K1, a diode D3 and a transistor Q5. In one embodiment, the relay K1 may be, but not limited to, any one of a mechanical relay, a solid-state relay, an electronic switch and a photoelectric switch. The above is just for illustration, the relay K1 may also be other similar components. The constant-voltage power supply module 14 may include a constant-voltage auxiliary power supply CV. The PFC module 15 may include an application specific integrated circuit (ASIC) chip CP2, an inductor L2, a diode D1, a transistor Q4, a resistor R1 and a capacitor C3. The embodiment is just for illustration, the circuit designs of the modules of the high-compatibility dimmer circuit 1 can be changed according to actual requirements.

In the embodiment, the operational process of the main loop of the high-compatibility dimmer circuit 1 is as follows:

The alternating voltage input module 11 rectifies and filters the input alternating voltage Ain via the bridge rectifier R1 and the filter capacitor respectively in order to generate the pulsating direct voltage Ps. The PFC module 15 boosts the pulsating direct voltage Ps in order to generate the boosted direct voltage Bs for powering the load LR. Simultaneously, the on-time of the main transistor Q4 of the PFC module 15 varies with the sine wave of the input voltage, such that the conduction angle of the rectifier diode of the alternating voltage input module 11 can be greater in order to increase the power factor. Meanwhile, the pulsating direct voltage Ps is inputted in to the constant-voltage power supply module 14, and the constant-voltage power supply module 14 converts the pulsating direct voltage Ps into the constant voltage Vs in order to power the control unit 12A and the impedance inspection avoidance module 13.

As set forth above, as the high-compatibility dimmer circuit 1 of the embodiment has the specially-designed impedance inspection avoidance module 13, so the high-compatibility dimmer circuit 1 can be applicable to all currently available lamp tubes having grid impedance inspection function. In the embodiment, the operational process of the grid impedance inspection function of the high-compatibility dimmer circuit 1 is as follows:

The alternating voltage input module 11 rectifies and filters the input alternating voltage Ain via the bridge rectifier R1 and the filter capacitor respectively in order to generate the pulsating direct voltage Ps. In the meanwhile, the pulsating direct voltage Ps is inputted into the constant-voltage power supply module 14 and the constant-voltage power supply module 14 converts the pulsating direct voltage Ps into the constant voltage Vs in order to power the control unit 12A and the impedance inspection avoidance module 13. When the load LR is driven, the microcontroller unit CP1 of the control unit 12A starts timing. Then, the T out pin of the microcontroller unit CP1 outputs a control signal Ts to switch the relay K1 of the impedance inspection avoidance module 13 after a predetermined time period (0.1-0.5 seconds). Since the grid impedance inspection circuit of the load LR has finished the inspection process after the predetermined time period (0.1-0.5 seconds), the load LR can be powered by the dimming module 12.

As described above, the grid impedance inspection circuit of the load LR performs the inspection process for only one time. In other words, the inspection process will not be performed again if the input voltage of the grid impedance inspection circuit does not decrease to be lower than a specific threshold value. Thus, the load LR can keep being in on state. The high-compatibility dimmer circuit 1 of the embodiment can take full advantage of the above characteristics with a view to effectively evade the grid impedance inspection, so the high-compatibility dimmer circuit 1 can be compatible with all currently available lighting devices having grid impedance inspection function.

In the embodiment, the operational process of the dimming function of the high-compatibility dimmer circuit 1 is as follows:

After the grid impedance inspection circuit of the load LR has finished the inspection process and the load LR is powered by the dimming module 12, the PWM out pin of the microcontroller CP1 of the control unit 12A outputs a corresponding PWM signal PWM1 to the PWM signal totem-pole unit 12B according to the dimming signal Ds and a built-in comparison table thereof. Then, the PWM signal totem-pole unit 12B generates an enhanced PWM signal PWM2 according to the PWM signal PWM1. The ability of inputting current into the gate of the transistor (MOS) can be enhanced, such that the transistor can enter the saturation state faster. Besides, the transistor can also exit from the saturation state and then enter the cut-off state in a short time. Afterward, the constant-current switch unit 12C changes the mode of turning on/off switches according to the enhanced PWM signal Q1 (switch) in order to adjust the driving current Cs of the load LR and perform dimming.

Since the driving circuits of all lighting devices with or without dimming function adopt semiconductor switches (except linear power sources), and all driving solutions limit the maximal on-time of semiconductor switch elements. Accordingly, when the input voltage is low enough, the on-time, provided by the driving circuit, of the semiconductor switch reaches the maximum; now, the driving circuit is not in active current-limited/constant-current state. In this way, the current control of the load can be realized by properly reducing the input voltage in order to execute the dimming function. The high-compatibility dimmer circuit 1 of the embodiment can take full advantage of the characteristics, so can realize the dimming function for all lighting devices without dimming function by controlling the current and reducing the voltage.

The embodiment just exemplifies the present invention and is not intended to limit the scope of the present invention; any equivalent modification and variation according to the spirit of the present invention is to be also included within the scope of the following claims and their equivalents.

Figure 3:
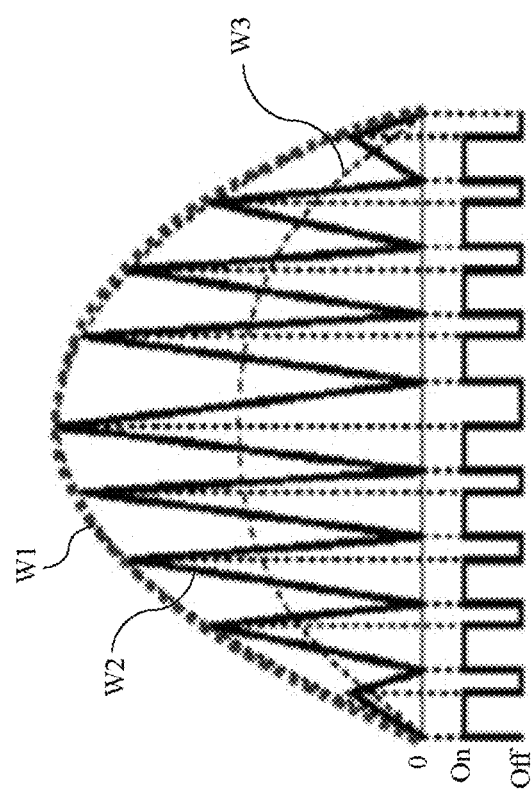
FIG. 3 is a schematic view of a constant-current switch unit of the high-compatibility dimmer circuit in accordance with the first embodiment of the present invention.

Please refer to FIG. 3, which is a schematic view of a constant-current switch unit of the high-compatibility dimmer circuit in accordance with the first embodiment of the present invention. FIG. 3 illustrates the waveforms of the signals of the constant-current switch unit 12C. As shown in FIG. 3, W1 stands for the envelope of the peak current; W2 stands for the inductance current; W3 stands for the average inductance current.

As shown in FIG. 1 and FIG. 2, the high-compatibility dimmer circuit 1 of the embodiment can further provide the short-circuit protection function and the operational process thereof is as follows:

When the output end is short-circuited, the voltage difference Fs between two ends of the resistor Rs connected to the constant-current switch unit 12C in series suddenly increases. The OC DET pin of the microcontroller unit CP1 of the control unit 12A detects the voltage difference Fs between the two ends of the resistor Rs and compares which with the built-in default value of the microcontroller unit CP1. When the microcontroller unit CP1 determines that the voltage difference Fs between the two ends of the resistor Rs exceeds the default value, the microcontroller unit CP1 outputs a low-level signal to the constant-current switch unit 12C in order to control the constant-current switch unit 12C to enter the hiccup mode from the normal mode so as to perform the short-circuit protection function. In the normal state, the OC DET pin of the microcontroller unit CP1 can also serve as the current limiting reference pin. That is to say, the maximum of the output current can be changed by changing the voltage of the OC DET pin.

As set forth above, the circuit design of the high-compatibility dimmer circuit 1 can take full advantage of the original characteristics of switch power sources, which can reduce the voltage by controlling the current. Thus, the high-compatibility dimmer circuit can be compatible with various DC or AC lighting devices so as to achieve high commonality.

In addition, the high-compatibility dimmer circuit 1 has an impedance inspection avoidance module, which can perform a special operating mechanism in order to provide an AC-grid impedance inspection avoidance function. Accordingly, the high-compatibility dimmer circuit can be compatible with all lighting devices having AC-grid impedance inspection function with a view to further increase the commonality thereof.

The embodiment just exemplifies the present invention and is not intended to limit the scope of the present invention; any equivalent modification and variation according to the spirit of the present invention is to be also included within the scope of the following claims and their equivalents.

It is worthy to point out that there are too many dimming solutions, which not only increases the costs of lighting devices having dimming function, but also limits the commonality and penetration rate thereof. Besides, the commonest lighting devices are lighting devices having no dimming function for now. On the contrary, according to one embodiment of the present invention, the design of the high-compatibility dimmer circuit can take full advantage of the original characteristics of switch power sources, which can reduce the voltage by controlling the current. Thus, the high-compatibility dimmer circuit can be compatible with various DC or AC lighting devices so as to achieve high commonality.

Also, according to one embodiment of the present invention, the design of the high-compatibility dimmer circuit can be compatible with various DC or AC lighting devices having no dimming function. Therefore, the high-compatibility dimmer circuit can serve as an effective and low-cost solution in order to conform to actual requirements.

Further, according to one embodiment of the present invention, the high-compatibility dimmer circuit has an impedance inspection avoidance module, which can perform a special operating mechanism in order to provide an AC-grid impedance inspection avoidance function. Accordingly, the high-compatibility dimmer circuit can be compatible with all lighting devices having AC-grid impedance inspection function with a view to further increase the commonality thereof.

Moreover, according to one embodiment of the present invention, the circuit design of the high-compatibility dimmer circuit can make the output current be proportional to the output voltage to achieve a linear relation, so the high-compatibility dimmer circuit can be more comprehensive in application.

Furthermore, according to one embodiment of the present invention, the high-compatibility dimmer circuit can control the constant-current switch unit to enter the hiccup mode in order to perform the short-circuit protection function. Therefore, the safety of the high-compatibility dimmer circuit can be further enhanced. As described above, the high-compatibility dimmer circuit according to the embodiments of the present invention can achieve great technical effects.

Figure 4:
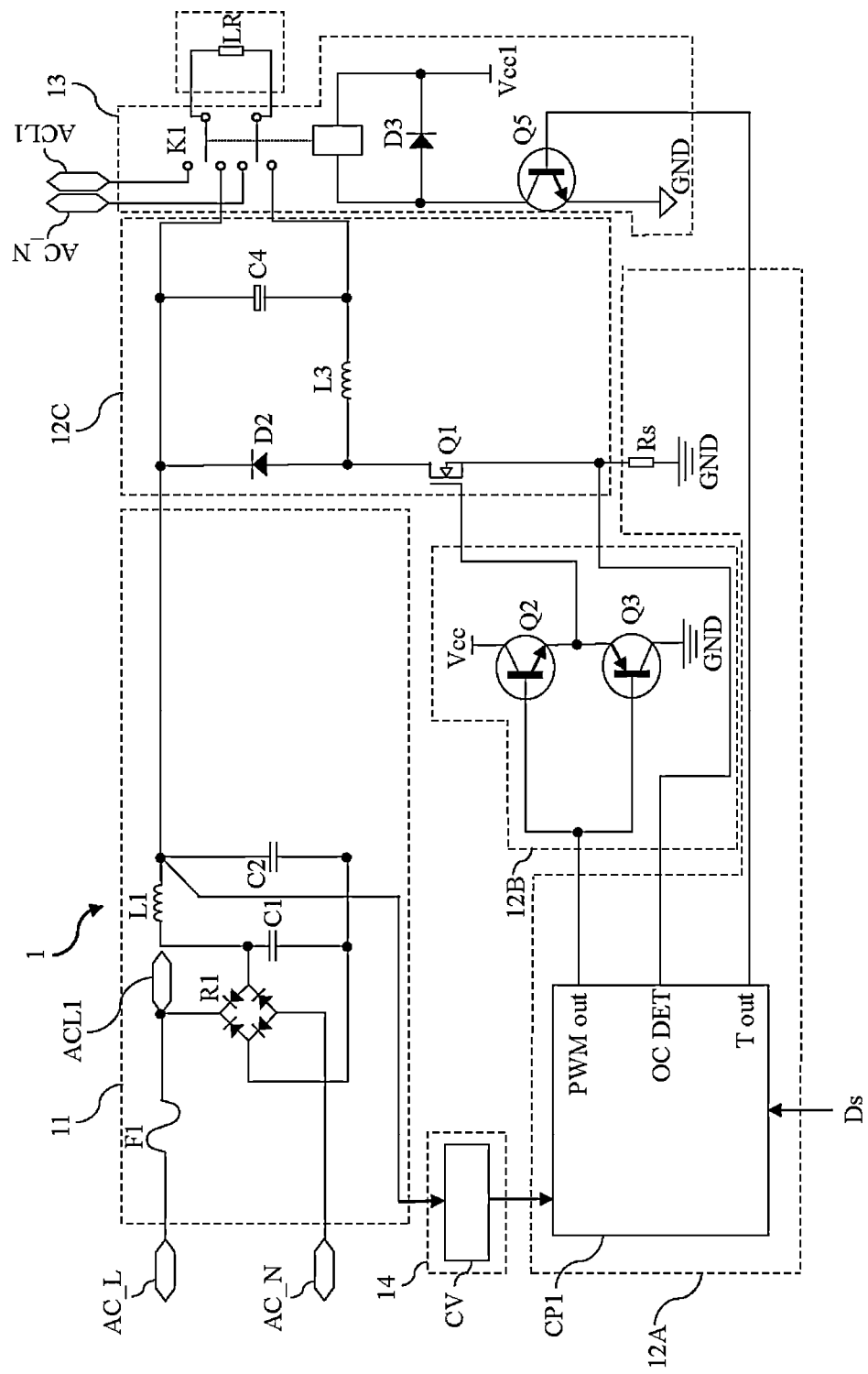
FIG. 4 is a block diagram of a high-compatibility dimmer circuit in accordance with a second embodiment of the present invention.

Please refer to FIG. 4, which is a block diagram of a high-compatibility dimmer circuit in accordance with a second embodiment of the present invention. As shown in FIG. 4, the high-compatibility dimmer circuit 1 includes an alternating-current input module 11, a dimming module 12, an impedance inspection avoidance module 13 and a constant-voltage power supply module 14. The dimming module 12 includes a control unit 12A, a PWM signal totem-pole unit 12B and a constant-current switch unit 12C.

The difference between this embodiment and the previous embodiment is that the high-compatibility dimmer circuit 1 of this embodiment omits the PFC module 15. The power factor correction function can be realized via the constant-current switch unit 12C. For instance, the power factor can be increased by changing the frequency and the duty cycle of the switching signal of the constant-current switch unit 12C.

The high-compatibility dimmer circuit 1 of the embodiment can also provide the grid impedance inspection avoidance function, dimming function and short-circuit protection function. The operational process of the grid impedance inspection avoidance function is as follows:

The alternating voltage input module 11 rectifies and filters an input alternating voltage Ain via a bridge rectifier R1 and a filter capacitor respectively in order to generate a pulsating direct voltage Ps. In the meanwhile, the pulsating direct voltage Ps is inputted into the constant-voltage power supply module 14 and the constant-voltage power supply module 14 converts the pulsating direct voltage Ps into a constant voltage Vs in order to power the control unit 12A and the impedance inspection avoidance module 13. When the load LR is driven, the microcontroller unit CP1 of the control unit 12A starts timing. Then, the T out pin of the microcontroller unit CP1 outputs a control signal Ts to switch the relay K1 of the impedance inspection avoidance module 13 after a predetermined time period (0.1-0.5 seconds). Since the grid impedance inspection circuit of the load LR has finished the inspection process after the predetermined time period (0.1-0.5 seconds), the load LR can be powered by the dimming module 12.

As described above, the high-compatibility dimmer circuit 1 of the embodiment can also evade the grid impedance inspection, so can be compatible with all currently available lighting devices having grid impedance inspection function.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the design of the high-compatibility dimmer circuit can take full advantage of the original characteristics of switch power sources, which can reduce the voltage by controlling the current. Thus, the high-compatibility dimmer circuit can be compatible with various direct-current (DC) or alternating-current (AC) lighting devices so as to achieve high commonality.

Also, according to one embodiment of the present invention, the design of the high-compatibility dimmer circuit can be compatible with various DC or AC lighting devices having no dimming function. Therefore, the high-compatibility dimmer circuit can serve as an effective and low-cost solution in order to conform to actual requirements.

Further, according to one embodiment of the present invention, the high-compatibility dimmer circuit has an impedance inspection avoidance module, which can perform a special operating mechanism in order to provide an AC-grid impedance inspection avoidance function. Accordingly, the high-compatibility dimmer circuit can be compatible with all lighting devices having AC-grid impedance inspection function with a view to further increase the commonality thereof.

Moreover, according to one embodiment of the present invention, the circuit design of the high-compatibility dimmer circuit can make the output current be proportional to the output voltage to achieve a linear relation, so the high-compatibility dimmer circuit can be more comprehensive in application.

Furthermore, according to one embodiment of the present invention, the high-compatibility dimmer circuit can control the constant-current switch unit to enter the hiccup mode in order to perform the short-circuit protection function. Therefore, the safety of the high-compatibility dimmer circuit can be further enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high-compatibility dimmer circuit, comprising:
   an impedance inspection avoidance circuit, connected to a load via an output end;
   a dimming module, connected to the impedance inspection avoidance module and comprising a control unit; and
   an alternating-voltage input module, connected to the dimming module and configured to convert an input alternating voltage into a pulsating direct voltage so as to power the load and the dimming module;

wherein when the load is driven, the control unit is configured to start timing and switch the impedance inspection avoidance module after a predetermined time period, so that the dimming module directly powers the load and performs dimming for the load according to a dimming signal inputted by an external device.

2. The high-compatibility dimmer circuit as claimed in claim 1, wherein the dimming module further comprises a pulse width modulation signal totem-pole unit and a constant-current switch unit, wherein the control unit is connected to the pulse width modulation signal totem-pole unit and the constant-current switch unit, the pulse width modulation signal totem-pole unit is connected to the constant-current switch unit, and the constant-current switch unit is connected to the alternating-voltage input module and the impedance inspection avoidance module.

3. The high-compatibility dimmer circuit as claimed in claim 2, wherein the control unit is configured to generate a pulse width modulation signal according to the dimming signal and the pulse width modulation signal totem-pole unit is configured to generate an enhanced pulse width modulation signal according to the pulse width modulation signal, wherein the constant-current switch unit is configured to change a mode of turning on/off switches according to the enhanced pulse width modulation signal in order to adjust a driving current of the load and perform dimming.

4. The high-compatibility dimmer circuit as claimed in claim 2, further comprising a constant-voltage power supply module, wherein the dimming module is connected to the alternating-voltage input module via the constant-voltage power supply module, and the constant-voltage power supply module is configured to convert the pulsating direct voltage into a constant voltage so as to power the dimming module.

5. The high-compatibility dimmer circuit as claimed in claim 2, further comprising a power factor correction module, wherein the constant-current switch unit is connected to the alternating-voltage input module via the power factor correction module, and the power factor correction module is configured to generate a boosted direct voltage according to the pulsating direct voltage in order to power the dimming module.

6. The high-compatibility dimmer circuit as claimed in claim 5, wherein the power factor correction module is an active power factor correction module.

7. The high-compatibility dimmer circuit as claimed in claim 1, wherein when the input end is short-circuited, the control unit is configured to control the constant-current switch unit to enter a hiccup mode in order to perform a short-circuit protection function.

8. The high-compatibility dimmer circuit as claimed in claim 1, wherein the predetermined time period is 0.1-0.5 seconds.

9. The high-compatibility dimmer circuit as claimed in claim 1, wherein the load is a light source without a dimming function.

10. The high-compatibility dimmer circuit as claimed in claim 1, wherein the impedance inspection avoidance module is any one of a mechanical relay, a solid-state relay, an electronic switch and a photoelectric switch.

* * * * *